United States Patent
Schulte

(10) Patent No.: US 9,598,856 B2
(45) Date of Patent: Mar. 21, 2017

(54) GLUELESS COMPOSITE PANEL AND METHOD FOR THE GLUELESS CONNECTION OF TWO PANEL ELEMENTS

(71) Applicant: Guido Schulte, Ruethen-Meiste (DE)

(72) Inventor: Guido Schulte, Ruethen-Meiste (DE)

( * ) Notice: Subject to any disclaimer, the term of this patent is extended or adjusted under 35 U.S.C. 154(b) by 0 days.

(21) Appl. No.: 14/760,670

(22) PCT Filed: Dec. 18, 2013

(86) PCT No.: PCT/DE2013/100431
§ 371 (c)(1),
(2) Date: Aug. 31, 2015

(87) PCT Pub. No.: WO2014/108114
PCT Pub. Date: Jul. 17, 2014

(65) Prior Publication Data
US 2015/0368896 A1 Dec. 24, 2015

(30) Foreign Application Priority Data
Jan. 14, 2013 (DE) .................. 10 2013 100 352

(51) Int. Cl.
*E04B 1/26* (2006.01)
*E04B 1/61* (2006.01)
(Continued)

(52) U.S. Cl.
CPC .............. *E04B 1/54* (2013.01); *A47B 47/042* (2013.01); *E04B 1/6137* (2013.01); *F16B 5/07* (2013.01);
(Continued)

(58) Field of Classification Search
CPC .......... A47B 47/042; A47B 2230/0062; F16B 5/0036; F16B 5/0635; F16B 12/22;
(Continued)

(56) References Cited

U.S. PATENT DOCUMENTS 1,533,099 A * 4/1925 Carroll ................. E06B 3/9845
403/231
1,534,468 A * 4/1925 Shea, Jr. .................. B65D 7/12
403/382

(Continued)

FOREIGN PATENT DOCUMENTS

| DE | 202009008825 U1 | 10/2009 |
| WO | 2011160173 A1 | 12/2011 |
| WO | 2013093636 A2 | 6/2013 |

OTHER PUBLICATIONS

ISR for PCT/DE2013/100431 mailed May 27, 2014.

*Primary Examiner* — Gregory Binda
*Assistant Examiner* — Nahid Amiri
(74) *Attorney, Agent, or Firm* — Hauptman Ham, LLP

(57) ABSTRACT

A glueless composite panel is disclosed having a first panel element and a second panel element. The two panel elements are connected together by coupling and extend in each case parallel to a longitudinal direction of a first end side of the first panel element. A first groove is arranged on the first panel element on the first end side thereof, the groove being delimited by a tongue and an edge strip that is set back with respect to the tongue. The first edge strip is in this case subdivided into individual first strip sections. The second panel element has corresponding coupling such that in the coupled state of the two panel elements the first strip sections and second strip sections of the second panel element undercut one another at least regionally.

15 Claims, 6 Drawing Sheets

(51) Int. Cl.
 *A47B 47/04* (2006.01)
 *F16B 5/07* (2006.01)
 *F16B 12/12* (2006.01)
 *F16B 5/06* (2006.01)
 *F16B 12/46* (2006.01)

(52) U.S. Cl.
 CPC .......... *F16B 12/125* (2013.01); *F16B 5/0635* (2013.01); *F16B 2012/463* (2013.01); *Y10T 29/49828* (2015.01); *Y10T 403/7045* (2015.01)

(58) Field of Classification Search
 CPC .......... F16B 12/34; F16B 12/125; E04B 1/54; E04B 1/6137; Y10T 29/49948; Y10T 29/49826; Y10T 403/7045
 USPC ....... 403/205, 231, 265, 266, 267; 52/287.1, 52/288.1, 592.1
 See application file for complete search history.

(56) References Cited

U.S. PATENT DOCUMENTS

| | | | | |
|---|---|---|---|---|
| 1,936,733 | A * | 11/1933 | Richardson | A47B 88/0014 217/65 |
| 3,193,886 | A * | 7/1965 | Wenger | E04B 1/54 217/65 |
| 4,015,716 | A * | 4/1977 | Nichols | B65D 81/113 206/521 |
| 5,588,726 | A * | 12/1996 | Lee | F16B 12/02 312/263 |
| 6,817,153 | B2 * | 11/2004 | Steinberg | E04F 13/0864 403/231 |
| 6,823,638 | B2 * | 11/2004 | Stanchfield | E04F 15/02 52/586.2 |
| 7,641,414 | B1 * | 1/2010 | Joyce | A47B 47/042 403/231 |
| 2008/0302279 | A1 | 12/2008 | Clifton | |
| 2011/0280655 | A1 | 11/2011 | Maertens et al. | |

\* cited by examiner

GLUELESS COMPOSITE PANEL AND METHOD FOR THE GLUELESS CONNECTION OF TWO PANEL ELEMENTS

RELATED APPLICATIONS

The present application is a National Phase of International Application Number PCT/DE2013/100431, filed Dec. 18, 2013, and claims priority from German Application Number 102013100352.4, filed Jan. 14, 2013.

The invention relates to a glueless panel connection according to the features in the preamble of claim 1 and to a method for the glueless connection of at least two panel elements of a panel connection according to the features of claim 15.

A plurality of furnishings include panel elements or are formed by said panel elements. Along with purely decorative arrangements, in particular in the form of furniture, they form the predominant part of the shaping of mostly closed areas. Depending on the functionality as seat, table or storage furniture, they are also used outdoors.

In order to create a sitting surface, storage area or parking area, these comprise a panel element, which in the majority of cases is horizontally aligned and is stored or situated either directly on a wall region or, by means of an additional arrangement, on a wall region or a floor region. The development thereof, in the majority of cases, provides at least two panel elements which are connected together in an alignment that is angled with respect to one another. In particular, storage or containment furniture, in this connection, comprise an open carcass produced from three and more panel elements which, where required, can be closed, for example, by a door.

The mostly self-supporting base element of such an item of furniture comprises a basic structure which is composed, in the majority of cases, by at least two panel elements. In this case, the individual panel elements can assume, for example, the function of a side part, a floor or a cover. In particular, in the case of carcasses created in this manner, the panel elements thereof, assembled to form a frame, are connected together by means of a rear wall which, in the form of a plate, stabilizes and fixes the position of the individual panel elements with respect to one another.

In the prior art it is known to join the individual panel elements for example in a glued manner or so that they are able to be taken apart. In this case, the regions of the panel elements that are in contact with one another are connected together by a suitable adhesive connection. These types of adhesive connections are effected in the majority of cases by using additional wooden dowels. Along with the butt joints of the panel elements, they can also comprise a miter at the end face, by means of which the alignment of the interconnected panel elements is matched to one another.

In contrast, structures that can be taken apart are realized in such a manner that the individual panel elements are coupled together for example by means of releasable furniture connectors. Along with the connector fittings to be used, for example, in the case of a carcass in the inside region, invisible body connectors have also been established. These comprise a screw bolt which is screwed into an end face or side face of the respective wall element by means of its thread. A threadless portion of the screw bolt, in this case, comprises a bolt head which corresponds with a flattened cylindrical eccentric connector.

Glued connections offer an extremely durable option to connect individual panel elements to one another. The respectively necessary adhesive connection depends on the anticipated load and, in particular, on the materials used for the panel elements. Such panel elements are usually provided from timber or timber materials, for example. Over and above this, however, they can also be formed, for example, from plastics material or glass and mineral components.

On account of the mostly necessary arrangement of wooden dowels for fixing the position and transmitting shear forces as well as the inevitable drying time, these types of connections require a correspondingly long production time. In addition, an extremely careful method of operation is necessary in order, along with a durable connection, not to contaminate unintentionally the visible faces with adhesive, for example with glue. In addition, a stuck-together panel connection has to be destroyed where necessary in order to take it apart.

In contrast, the use of furniture connectors offers a simple option for the glueless production of such a panel connection. Where required, this can then easily be taken apart by means of the releasable connecting means and, for example, can be re-assembled at another location. Nevertheless, these types of furniture connectors make corresponding demands on the assembly of the wall elements, which is supplemented by additional expenditure when mounting such a panel connection. In particular, the time required for assembly drives up the costs incurred for production. In this respect, economic production of this type of panel connection is very difficult. To this must be added the risk of any overtightened connecting means which results, for example, in the internal thread breaking down inside such a panel connection.

DE 20 2009 008 825 U1 discloses a further option for assembling two panel elements which are connectable together in a glueless manner by means of coupling means that are arranged thereon. As a glueless panel connection, this comprises at least one first panel element and one second panel element which, when they are connected together, enclose between them an angle that is not equal to 180 degrees. The coupling means extend in each case parallel to a longitudinal direction of the end faces of the panel elements.

The coupling means are formed as a result of the first panel element having a first groove which is arranged on its end face. In contrast, the second panel element comprises a groove which is arranged on an inside edge region connecting at the side to its end face and is defined at the side by an edge strip which merges into the end face. The groove arranged in the end face of the first panel element is defined by a tongue and a first edge strip which is recessed in relation to the tongue.

The first edge strip, in this case, is developed in an elastic manner insofar as it is exposed by means of a slot arranged in the side face of the first panel element and is displaceable into said slot in a resilient manner during the coupling operation.

As a result, a glueless panel connection, which makes possible quick assembly of the panel elements which are to be connected to one another, is created. Any possible releasing of the connection is, however, only possible with corresponding effort, preventing the risk of destruction, in particular of the resilient part of the first edge strip, basically not being possible. In addition, the panel elements to be connected together have to be shaped with corresponding expenditure and effort as well as precision with reference to their coupling means in order to produce the necessary stresses between the panel elements to be connected together. A connection between the panel elements which is as gap-free as possible can only be realized in this manner.

Against said background, the glueless panel connection produced from individual panel elements still has room for improvement.

The object underlying the present invention, in this case, is to provide a glueless panel connection as well as a method for the glueless connection of at least two panel elements to form a panel connection, wherein the panel elements are to make possible simple production of their sturdily realized coupling means, by means of which the panel elements are able to be assembled in a very short time to form a durable panel connection which, where required, can easily be taken apart without fatigue or even destruction of the coupling elements.

The solution of the objective part of the object consists according to the invention in a glueless panel connection with the features of claim 1. The procedural part of the object is achieved by a method for the glueless connection of at least two panel elements to form a panel connection with the features of claim 15.

Accordingly, the glueless panel connection includes at least one first panel element and one second panel element, wherein the two panel elements are connectable together by means of coupling means which are arranged on said panel elements and extend in each case parallel to a longitudinal direction of the respective end faces thereof. With panel elements connected together, they enclose between them an angle that is not equal to 180°. The individual coupling means are formed such that the first panel element has a first groove on its first end face, whilst the second panel element includes a second groove which is, however, not arranged on its second end face, but on an inside edge region which connects at the side to its second end face. The groove arranged in the inside edge region of the second panel element is defined at the side by a second edge strip which merges into the second end face of the second panel element. The first groove, which is admitted at the end face of the first panel element, is defined by a tongue and a first edge strip which is recessed in relation to the tongue.

According to the invention, both the first edge strip and the second edge strip of the respective panel elements are broken multiple times in their extension parallel to the longitudinal direction of the respective end faces. As a result, both the first edge strip is divided into individual first strip portions and the second edge strip is divided into individual second strip portions. The respective strip portions, in this case, are arranged in such a manner on the panel elements to be connected that, in their coupled state, the first strip portions and the second strip portions undercut one another at least in regions. In said position, the first strip portions and the second strip portions engage behind one another reciprocally. In this case, the first strip portions of the first panel element are arranged in the second groove of the second panel element, whilst the second strip portions of the second panel element are arranged in the first groove of the first panel element.

The particular advantage, in this connection, consists in the omission of any possible parts of the coupling means that are realized in a targeted flexible manner. As a result, no resistance whatsoever has to be overcome when coupling the individual panel elements which otherwise can only be overcome by displacing part of the coupling means to the side. As a result of the omission of resilient parts of the coupling means, possible material weakening as early as during the connecting of the panel elements is effectively prevented. Over and above this, the coupling means developed in this manner allow for the sturdy, non-flexible realization thereof which even over a long period of time brings about a durable connection between the panel elements.

In order, where required, to provide increased stresses between the parts of the coupling means which encompass one another, at least one of the first strip portions or of the second strip portions can be developed at least in regions in a wedge-shaped manner. In this case, the said wedge shape extends parallel to the longitudinal direction of the respective end face. Where there is a constant relative movement between the two panel elements which are in engagement with one another by means of the coupling means, the wedge shape causes the strip, developed in this manner, to require an increasing expenditure of force in order to be pushed further into the respective groove parallel to the longitudinal direction of one of the end faces. The cause of this is the increasing pressing pressure between the strip portion that is developed at least in regions in wedge-shaped manner and the groove that is otherwise uniformly wide over its development.

In contrast, at least one of the grooves that is located in each case in the region of the strip portions can comprise such a wedge-shaped development, whilst the strip portion corresponding with the groove developed in this manner has no wedge shape or a deviating wedge shape of at least one of its regions. In any case, the wedge-shaped development must be realized such that when a strip portion is pushed into one of the grooves, the stresses thereof in the contact region in relation to one another is increased by the respective cross section of the strip portion either being thickened or, however, the corresponding cross section of the groove being tapered.

A further advantage of the edge strips which are divided into individual strip portions is that the panel elements to be connected together do not have to be pushed into one another over the entire length of the edge strips, but only have to be moved closer to one another in an offset manner and locked together by means of a relative movement with respect to one another aligned in opposite directions. In this connection, the individual strip portions of one of the panel elements are pushed through between the strip portions of the respective other panel element until the respective position thereof extends in the plane of the corresponding groove. The individual strip portions are then displaced in the respective grooves by the two panel elements being displaced in opposite directions to one another parallel to the longitudinal direction of one of the end faces. In said position, the respective strip portions of the first panel element and of the second panel element undercut one another at least in regions.

As a rule, the panel elements to be connected together comprise the same width measured parallel to the longitudinal direction of their end faces. In a preferred manner, the individual strip portions are arranged in such a manner on the respective panel elements that they are aligned with one another when the panel elements are connected together. This ensures that the edges which extend at the edge between the end faces of the respective panel element extend in the same plane when the two panel elements are coupled together.

Insofar as the widths of the panel elements which are to be connected together differ from one another, the respective strip portions are arranged in a preferred manner such that they are in alignment with one another when the edges pointing in each case to a narrow side of the panel connection extend in the same plane after the relative movement of the two panel elements with respect to one another.

Advantageous further developments of the inventive concept of the object are the object of dependent claims 2 to 14.

Thus, both the first strip portions can be arranged at a spacing from one another and the second strip portions can be arranged at a spacing from one another. In a particularly preferred manner, the respective spacing between the first strip portions or the second strip portions is constant. Depending on the realization, the respective spacing between the first strip portions or the second strip portions can also be different. Different means that, for example, two directly adjacent strip portions of a panel element are at a spacing from one another that differs from the spacing between said strip portions and a respective adjacent strip portion.

Where there are different spacings between the individual strip portions, these are realized in a preferred manner such that they are repeated. In other words, two strip portions can have a large spacing between them, whilst there is only a small spacing to the respective adjacent strip portion. The strip portions following thereto in the longitudinal direction once again assume a large spacing and so on.

As a result of the arrangement of the individual spacings between the strip portions, the respective number of strip portions on the respective panel element can be adjusted. The result of a large number of strip portions is that the interconnected panel elements comprise a plurality of undercuts. In contrast, strip portions arranged with a large spacing between one another reduce their number such that the amount of possible undercuts inside the panel connections is also reduced. In this way, regions which are subject to higher loads with reference to the coupling of the two panel elements can have a plurality of strip portions. In contrast, less loaded regions can be realized such that the strip portions arranged there are reduced to a minimum on account of the large spacings between them.

The individual strip portions comprise a length which is determined, in particular, by the respective spacing between the individual strip portions. Thus, with reference to the production, an edge strip, which is then broken into individual strip portions by corresponding material removal, is created first of all on one of the panel elements. Insofar as the individual breaks turn out to be small with reference to the respective longitudinal direction of the edge strips, whilst the spacings between the individual breaks with respect to one another are large, a corresponding length of the individual strip portions is achieved. In contrast, the breaks can also occupy larger regions such that when the individual breaks are tightly arranged, the length of the respective strip portions is clearly reduced.

In a preferred manner, the spacing between the first strip portions corresponds at least to a length of the second strip portions measured parallel to the longitudinal direction of the second end face. In contrast, the spacing between the second strip portions can correspond at least to a length of the first strip portions measured parallel to the longitudinal direction of the first end face.

In this way, the respective lengths of the strip portions of one panel element are adapted to the spacings between the individual strip portions of the other panel element. The largest possible face for the necessary undercuts is created as a result of said ratio.

In addition, it is provided that the second end face of the second panel element has a head strip which extends parallel to the longitudinal direction thereof. In contrast, the tongue of the first panel element can comprise a coupling channel which corresponds with the head strip. In this connection, the head strip of the one panel element, with the two panel elements in the coupled state, is arranged in the latching channel of the other panel element.

The advantage is that, as a result of the head strip arranged in the coupling channel, the two interconnected panel elements have a guide, inside which the two panel elements are held with respect to one another during the relative movement. Over and above this, as a result of the coupling channel and the head strip arranged therein, additional contact faces are created which, on account of their spacing to a possible pivot point, are located between the interconnected panel elements and increase the rigidity necessary in each case in the panel connection created in this manner.

In said context, the head strip can be adapted in shape to the cross section of the coupling channel. In this way, as sturdy as possible a seat is created between the head strip and the coupling channel which enables a sturdy and consequently static connection between the two panel elements.

In addition, it is provided that in each case the first strip portions are also adapted in shape to the second groove and the second strip portions are correspondingly adapted in shape to the first groove. Obviously, the cross sectional form of the strip portions and grooves, which is adapted in shape in each case, can also only refer to some portions or regions of the same.

In an advantageous manner, the tongue of the first panel element can merge into an outside side face located opposite the inside side face of the first panel element. As a result, the tongue proceeds seamlessly out of the outside side face of the first panel element or merges into the same without impairing the overall visual impression of the outside side face by any break or even any change in cross section. Over and above this, as a result, as narrow as possible a connection between the two panel elements is created, the respective coupling means of which are arranged such that, with the two panel elements in the connected state, they cover one another reciprocally and consequently are not visually perceivable.

In other words, in the present case the coupling means are located on the inside.

In principle, the individual coupling means can be fixed on the respective panel element for example by means of an adhesive connection or another type of connecting means.

In a particularly preferred manner, the respective coupling means are integral components of the respective panel element and are of the same material. In this connection, the coupling means are formed from the respective panel elements. Insofar as the panel elements consist, for example, of a timber material, the coupling means can be integrally molded on the respective panel element as early as during the production thereof. In contrast, the coupling means can also be formed by corresponding material removal from the material of the respective panel element.

In a particularly preferred manner, the tongue of the first panel element can be developed such that, in the coupled state of the panels elements, it completely conceals the second end face of the second panel element. In this way, a possible visual impairment of the panel connection in the region of the coupling means is extensively reduced as the visually perceivable separation of the panel connection into the individual panel elements is reduced to simply a break between the tongue of the first panel element and the second end face of the second panel element. Said break, in this case, with the two panel elements connected together, is only perceivable with reference to the second panel element at one side face of the panel connection.

In an advantageous manner, the individual coupling means are realized in a rigid manner. As a result, an impact that cannot be ruled out in practice when coupling the individual panel elements, does not result in any damage to the coupling means which diminishes the coupling. Over and above this, in this way no consciously elastically realized regions of the coupling means are provided which can be damaged in particular in the case of a constant load or even over-load during use or as early as during the connecting operation. In particular during assembly when using panel elements equipped with this type of resilient coupling means, possible over-extension in regions cannot be excluded, as a result of which plastic deformation or even damage to the resiliently realized part of the coupling means is effected, as a result of which the actual coupling action inside the panel connection is clearly reduced.

In principle, a first part region of the tongue which is located opposite the outside side face of the first panel element and adjoins the first end face can be realized such that it comprises a parallel development to the outside side face. As a result, the tongue has a constant thickness with reference to its extension perpendicular to the first edge strip.

In contrast, the tongue can also be realized such that at least one first part region of the tongue and an outside side face of the first panel element enclose between them a first angle of less than 90 degrees. In this way, at least one first part region of the tongue is inclined in relation to the outside side face of the first panel element. In this context, the second panel element can be realized such that at least one second part region of its second end face and an outside edge region located opposite the inside edge region enclose between then a second angle which is also less than 90 degrees. Consequently, a second part region of the second end face is also inclined in relation to the outside edge region of the second panel element.

In this way, either the first part region of the first panel element or, however, the second part region of the second panel element can be realized in an inclined manner. Obviously, both the first part region and the second part region of the two panel elements can also be developed in an inclined manner in this way.

The particular advantage is that the individual part regions of the respective end faces of the two panel elements are adapted to the respective coupling situation. The coupling situation means the respective position of the two panel elements with respect to one another with reference to the angle thereof enclosed between them. As a result of the inclination of at least one of the part regions, the respective contact face between the panel elements is enlarged, as a result of which, with the same load, any possible stresses between the panel elements are reduced. In addition, the visual characteristics of the panel connection can be adjusted to the effect that in particular as a result of the inclination of the first part region of the tongue, a displacement of the visually perceivable connection plane between the panel elements is displaceable as close as possible to the outside side face of the first panel element.

In an advantageous manner, with reference to their inclination, the respective part regions are matched to one another such that, with the two interconnected panel elements at the provided angular position, they rest flatly one on top of another. As a result, the entire face of the part regions can be utilized in order to transmit between them the stresses that may arise.

In an advantageous further development, the connection plane, which extends in the connected state of the panel elements between the first part region and the second part region, can extend in such a manner that it intersects an outside corner which is placed in the point of intersection of the respective elongations of the outside edge region of the second panel element and the outside side face of the first panel element. In this way, said connection plane extends through the outside corner of the panel connection formed from the panel elements.

In an advantageous manner, the connection plane, which is visually perceivable otherwise on one of the outside side faces of the interconnected panel elements, can be displaced in the outside corner of the panel connection. The typical appearance of two panel elements cut with a miter and connected together is produced as a result.

Along with the connection of two panel elements, these can obviously include coupling means realized either on only one of their end faces or on several of their end faces in the previously shown form. Thus, the invention provides that the panel connection according to the invention can include at least three such panel elements, wherein, in the state coupled together, the respective panel elements form a glueless carcass for example for an item of furniture in the form of a closed frame. In this way, four and more such panel elements can be assembled to form an open frame or a closed frame.

In a preferred manner, the panel elements can comprise a groove which extends in each case inside the assembled frame. A rear wall can be arranged inside said circumferential groove. In this case, the width of the groove is oriented in an advantageous manner to the respective thickness of the rear wall in order to receive it in as play-free a manner as possible. The groove can extend, in this case, up to the corner regions of the closed frame such that a circumferential groove is realized inside the frame. In this connection, it is necessary, prior to the frame being closed, to push the rear wall into the existing grooves of the individual panel elements before said frame is closed, for example, by a cover. This against the background, as subsequently pushing the rear wall into said groove is otherwise not possible.

Obviously, the respective grooves on the inside side faces of the frame, more precisely of the panel elements, can be at a spacing at least in regions from the respective inside corner regions of the closed frame. In this connection, the rear wall to be used comprises at least one recessed and consequently not completely realized corner region, the size of which is oriented to the part of the panel elements remaining between the grooves and the corner region. As a result of said development, it is possible to leave a corresponding opening in an inside corner region inside the rear wall, in the region of which opening no visually annoying groove is arranged inside the board elements.

In principle, the rear wall can be developed such that the dimensions thereof are oriented to the inside dimensions of the closed frame plus at least part of the respective depth of the groove admitted in at least one of the panel elements. As a result, the rear wall, once the frame has been closed, is guided in an almost play-free manner with reference to a movement of the rear wall inside the plane thereof.

As an alternative to this, the rear wall, in the installed state, can be at a spacing from at least one panel element, more precisely from the inside side face thereof. In this case, there is provided at least one wedge element which is then arrange able between said inside side face of the panel element and the rear wall. The wedge element bridges the gap created between the rear wall and the inside side face of a panel element, thereby positioning the rear wall, which is movable otherwise inside the remaining grooves, in its position. In other words, the rear wall, which is movable otherwise inside the groove, is fixed in its position by the wedge element and, at the same time, is spaced in relation to the one inside side face of the panel element.

Corresponding stress, which is transmitted into the individual inside corner regions and consequently onto the coupling means of the interconnected panel elements, can be built up between the rear wall and at least two oppositely located panel elements as a result of the at least one wedge element.

In principle, at least one of the panel elements can be developed in a shorter manner in the region of the groove provided for the rear wall. In this connection, an end face of said panel element is recessed behind the plane of the groove of adjacent panel elements. The advantage is that the rear wall can then still be moved into its provided position inside the closed frame, although said frame has already been completed into a closed frame. The part of the one panel element which is recessed in this case at the same time exposes the grooves mounted in the remaining panel elements toward an edge into which the rear wall is able to be subsequently inserted from one side.

In combination with the wedge element according to the invention, said rear wall can then be fixed in its provided position inside the frame.

When using such a wedge element, it is deemed to be particularly advantageous when it comprises a latching lug. The latching lug is provided for the purpose of securing the wedge element in its provided position against inadvertently falling out or being pulled out. In this case, the latching lug, with the wedge element in the arranged state, engages behind the rear wall whilst it is arranged between an inside side face of one of the panel elements and the rear wall. Obviously, the latching lug can also engage behind a region of a panel element, for example in a recess, in order to be fixed in its position. Depending on the development, said recess can also be the groove inside the panel element that serves in any case for receiving the rear wall.

With reference to the development of the coupling means, the first edge strip of the first panel element can merge into the inside side face of the first panel element. In this way, the inside side face of the first panel element, with the panel elements in the assembled state, merges directly into the second groove of the second panel element. As a result, as large as possible a gap between the individual parts of the coupling means is achieved, the inside lever arms enlarged in this manner leading to a reduction in the stresses which may arise in the connection region between the panel elements.

Depending on the requirement and in particular where thicker panel elements are used, the first edge strip can also be spaced from the inside side face of the first panel element. The part rising, consequently, from the first edge strip to the inside side face of the first panel element, in this connection, can provide an additional part face against which the second panel element can be supported inside the panel connection. In this way, the forces occurring between the panel elements in the connection region are transmittable to further part faces, as a result of which the respective loads can also be diminished as a result of reducing the stresses.

The present invention has demonstrated an extremely simple option for producing a glueless panel connection as well as the necessary panel elements thereof, which glueless panel connection is producible within a very short time and is able to be both interlocked and easily taken apart.

In particular, the altogether sturdy development of the individual coupling means enables an extremely durable connection between the panel elements which, even after joining and detaching the connection several times, enables a durable coupling. The omission of any possible elastically realized parts of the coupling means enables practical handling without excessive caution being necessary when assembling the panel connection. In this way, possible overstressing of the otherwise elastically developed and consequently for the most part delicately realized parts of the coupling means is also excluded during assembly, when taking apart and during storage. Associated signs of fatigue are not anticipated thanks to the sturdy realization of the coupling means.

All in all, the glueless panel connection creates an option that is pleasing to the eye and practical for the rapid completion of individual panel elements to form a panel connection. The taking apart of the panel connection, where required, proceeds without the necessity to displace or bend any possible parts of the coupling means as this simply requires a relative movement of the interconnected panel elements in each case in an opposite direction.

A solution according to the invention for the glueless connection of at least two panel elements to form a panel connection is demonstrated below.

The solution consists in a method for the glueless connection of at least two panel elements to form a panel connection, which panel elements in this case enclose between them an angle that is not equal to 180 degrees. For this purpose, said panel elements comprise coupling means that can be moved into engagement with one another and include individual edge strips which are divided into individual strip portions.

For connection, the panel elements are initially moved closer together until at least one of the first strip portions of the first panel element is slid through between two of the second strip portions of the second panel element and is placed in the plane of a second groove arranged on an inside edge region of the second panel element and at least one of the second strip portions in a plane of a first groove arranged on a first end face of the first panel element. As soon as the respective strip portions have reached the plane of the respective grooves, the panel elements to be connected together are then displaced in opposite directions to one another by means of a defined relative movement with respect to one another.

Said relative movement, in this case, takes place in a locking direction which extends parallel to a longitudinal direction of the first or the second end face. The relative movement is carried out in this case until the first strip portion is arranged at least in portions in the second groove and the second strip portion is arranged at least in portions in the first groove. In said position, the strip portions, displaced in this manner one behind another, undercut one another at least in portions such that separation of the interconnected panel elements is no longer possible on account of the undercuts realized.

The particular advantage is that, as a result, a durable connection between the panel elements is made possible, whilst omitting elastically, in particular resiliently realized parts of the connecting means. The measures known in the prior art for realizing such a panel connection in the majority of cases require the bridging of any possible holding force which subsequently secures the interconnected panel elements against unwanted release of the connection. In other words, in this connection, a resistance has first of all to be overcome where, for example, a region of the coupling means is displaced elastically in order, after its recovery, with the panel elements in the connected state, to correspond for example with an undercut. In order to release a connection realized in this manner again, in the majority of cases correspondingly high forces are necessary which result, not infrequently, in the destruction or at least the weakening of the further connection option of the panel elements that have been separated from one another in this manner.

The invention additionally provides that the second panel element comprises a head strip arranged on its second end face. The head strip extends, in this case, in the longitudinal direction of the second end face. In contrast, the first panel element can have a coupling channel which is realized on its tongue and corresponds with the head strip of the second panel element. Said parts of the coupling means are provided for the purpose of engaging the head strip of the second panel element in the coupling channel of the first panel element at the end of moving the panel elements closer to one another. In this connection, the coupling channel of the first panel element obviously also extends parallel to the longitudinal direction of the first end face. During the subsequent relative movement of the two panel elements, the head strip is consequently displaced inside the coupling channel parallel to the longitudinal direction of the end faces.

Along with the clear guiding of the panel elements generated in this manner during the relative movement, further parts of the connecting means are created as a result in order to be able to receive the loads of the panel connection that may arise.

In a further development, the coupling means can also have an additional projection and a recess which corresponds therewith. In said context, it is provided that during the relative movement of the wall elements with respect to one another in the locking direction, the projection arranged in each case on the coupling means engages in the recess that is also arranged on the coupling means.

The particular advantage here is in the moving of the wall elements closer to one another initially without any noteworthy resistance, as a result of which the actual, in particular durable connection between the panel elements is effected by means of the locking movement in the locking direction. Thus, the strip portions of the coupling means which comprise an undercut and, depending on the development, also the respective projection with a corresponding recess move into engagement with one another only during the relative movement of the panel elements with respect to one another.

As, in this connection, no noteworthy resistance has to be bridged, a type of connection between panel elements which protects the material overall is made possible as a result. In contrast, the releasing of such a connection is also effected by means of a relative movement of the interconnected panel elements which can be effected, for example, both against the locking direction and in continuation thereof. Separation of the two panel elements is achieved, in principle, as a result of the first and second strip portions being shifted relative to one another as a result of the relative movement of the panel elements such that when the panel elements are moved away from one another, they slide past one another in a meshing manner.

In a continuation of the principle inventive concept, the coupling means of at least one panel element can be realized at least in regions so as to be low-friction. This against the background of as simple as possible a connection between the panel elements which is created as a result of the relative movement and consequently of the associated engaging behind of the strip portions. To this end, the coupling means can either be realized in as slidable a manner as possible or, however, can comprises a corresponding coating. Obviously, the targeted sliding capability of the panel elements to be connected to one another can also not be effected until shortly before the coupling thereof, for example by using a suitable lubricant.

The aim is to reduce the sometimes high adhesive friction in the regions of the panel elements that make contact with one another, in particular the coupling means, in order to simplify the actual locking movement. Along with as smooth a surface finish as possible of said regions, for example by them comprising a high density of the actual panel material and a suitable surface treatment, they can also have friction-reducing coatings produced from a different material. Such a coating can be a varnish or a plastics material, for example. These form a self-adhesive coating which preferably even after several locking and unlocking movements of the panel elements are not subject to any significant wear. In contrast, the coating can also be realized as a lubricant which, in turn, is not fixedly connected to the regions in question but adheres to them in the form of an adhesive.

Along with the sliding friction, reduced in this manner, between the panel elements to be connected to one another or released from one another, additionally influencing the adhesive friction inside the connection is also conceivable. Thus, the regions that make contact with one another can comprise increased adhesive friction at least in regions such that the connection created by the locking movement between the panel elements is not easily releasable. In other words, for the desired separation thereof from one another, the adhesive friction set in a targeted manner in the connection region has to be overcome in order to move the individual strip portions out of their positions forming the undercuts. Depending on the development of the adhesive friction increased in this manner, both the locking and the unlocking movement would be correspondingly inhibited.

In addition, the lubricating means created in this manner can also be adjusted such that the respective friction is different depending on the direction. It would be preferred in this connection for the sliding friction to be reduced during the locking movement, whereas it would be increased in the opposite unlocking direction. At the same time, the adhesive friction can also be increased in this way with the panel elements in the interconnected state.

It is conceivable for the connection regions in question to be provided at least in part with a means which changes its characteristics over an adjustable period of time. Thus, said means can function initially as sliding means, for example, during the locking movement, whilst when the panel elements are coupled together it reduces or even loses its sliding capability or changes to an adhesive action. In said context, the means in question can harden over time, for example, as a result of which the created connection between the panel elements is strengthened adhesively.

In principle, the required sliding capability in the connection region can also be adjusted as a result of additional components which are arranged at least in regions or portions. For example, conceivable for this purpose are sliding strips in the form of plastics material bands, which are arranged, for example, in the groove and/or the coupling channel such that the corresponding edge strip or the corresponding strip portions and the head strip slide along one of the plastics material bands.

Said plastics material bands can either be inserted in a slack manner or, however, can be connected to the relevant regions of the panel elements. In the latter case, they can also be arranged on the parts of the coupling means that engage in the groove and/or the coupling channel. Along with a cross sectional development that is flat or adapted to the development of the coupling channel, said plastics material bands can also be in the shape of a U such that they also cover, at least in regions, the respective flanks of the coupling means. In said context, it is also conceivable for such a plastics material band in the form of an inlay to be adapted to the entire cross sectional development of the coupling means of a panel element.

Provided with possible swelling properties, it could be possible in this way to create an extremely slidable connection which, as a result of an increase in the cross section, brings about an extremely solid connection between the panel elements over a specific period of time. The increase in the cross section, in this case, could be adjusted such that a possible unlocking movement for separating the panel elements is either made more difficult or is even prevented.

The invention is explained in more detail below by way of a few exemplary embodiments that are shown schematically in the figures, in which.

Figure 1:
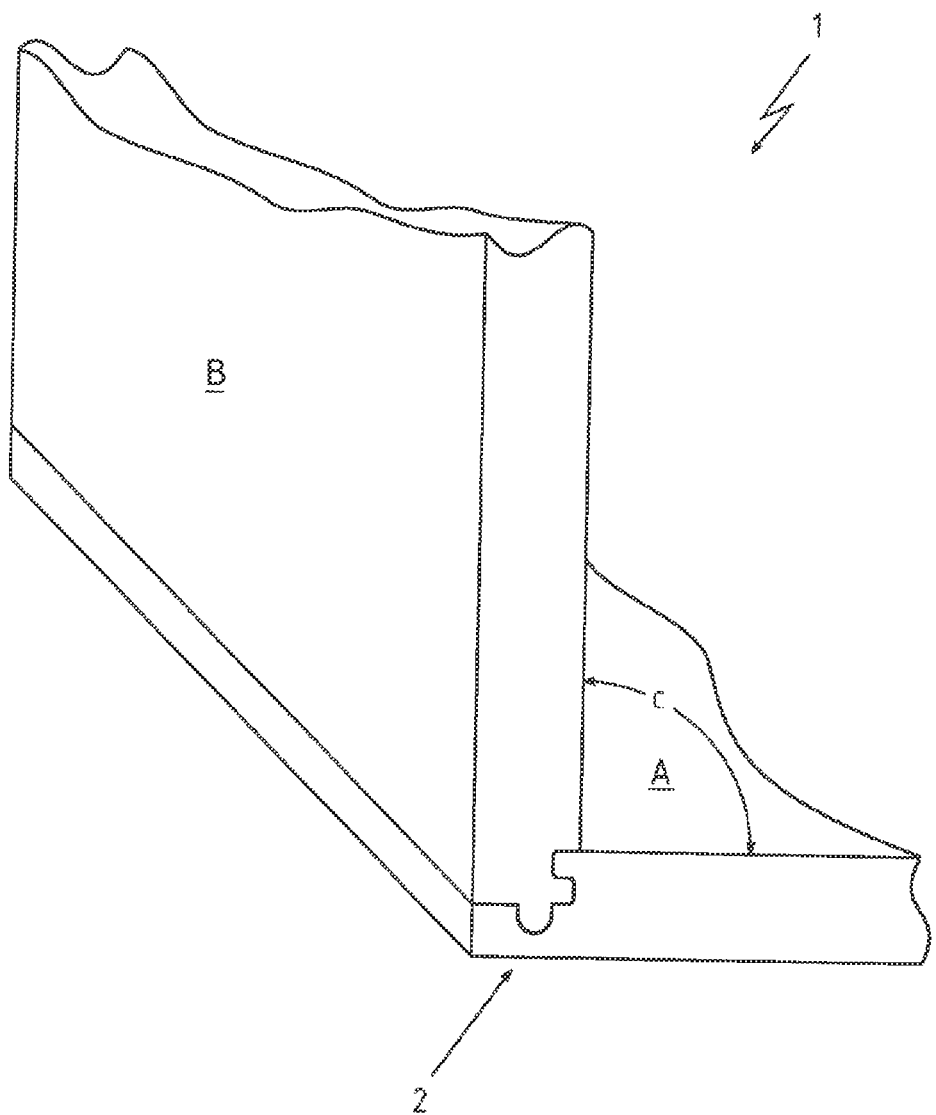
FIG. 1 shows a perspective method of representation of a glueless panel connection according to the invention.

FIG. 1 shows a perspective representation of a glueless panel connection 1 according to the invention. The panel connection 1 includes a first panel element A and a second panel element B which are connected together by means of coupling means 2 that are arranged thereon. To improve clarity, in the present case the two panel elements A, B are reduced to their regions close to the coupling means 2 and are consequently only shown in part.

The interconnected panel elements A, B are aligned with respect to one another such that they enclose between them an angle c that is not equal to 180°. In the present case, an angle c of 90 degrees is shown.

Figure 2:
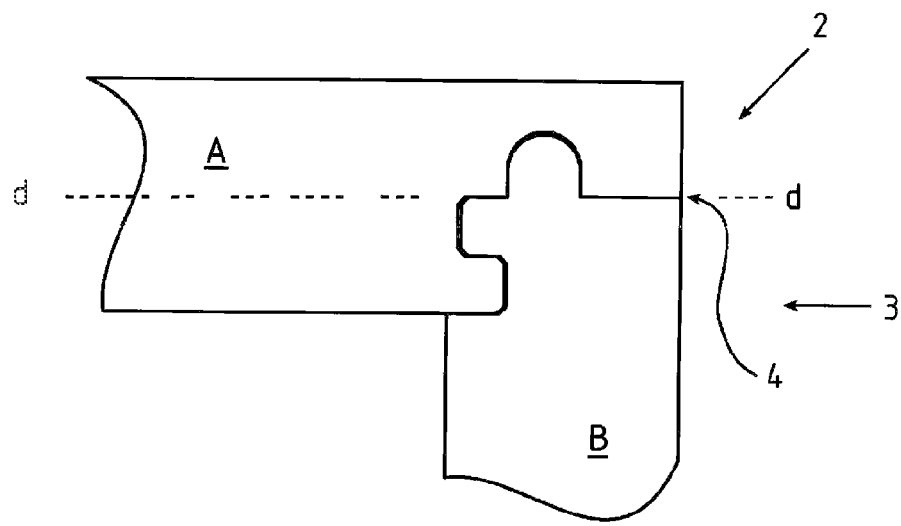
FIG. 2 shows a top view of the cutout of a detail of a connection region of the panel connection from FIG. 1.

FIG. 2 shows a view of a detail of the connection region of the panel connection 1 from FIG. 1. As can be seen, a connection plane d, which is visually perceivable as butt joint 4 from an outside 3 of the panel connection 1, runs between the first panel element A and the second panel element B.

Figure 3:
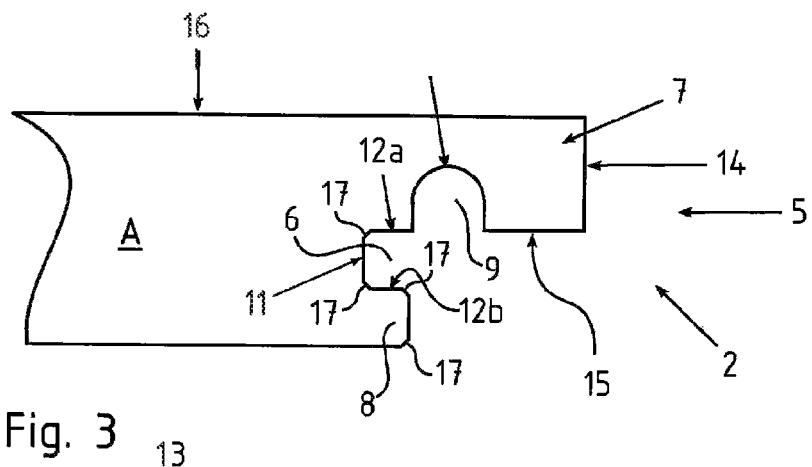
FIG. 3 shows the same method of representation of a first panel element of the detail from FIG. 2.

FIG. 3 shows the first panel element A of FIG. 2 in a representation separate from the second panel element B. As can be seen, the first panel element A includes a first end face 5 in which a first groove 6, directed into the first panel element A, is arranged. The first groove 6 is defined at the side in each case by a tongue 7 and a first edge strip 8 which is recessed in relation to the tongue 7.

The tongue 7 additionally comprises a coupling channel which is directed into said tongue and, with reference to its alignment, is offset by 90 degrees with respect to the first groove 6 and adjoins said first groove 6. The coupling channel 9 is developed such that it has a rounded bottom 10. In contrast, the first groove 6 is developed such that the bottom 11 thereof is aligned at right angles to flanks 12a, 12b of the first groove 6 that are aligned parallel to one another.

The bottom flank 12b of the first groove 6, when looking at the representation of FIG. 3, at the same time forms a side of the first edge strip 8 which is located opposite an inside side face 13 of the first panel element A. In the present case, said flank 12b comprises a parallel development to the inside side face 13 of the first panel element A. The coupling channel 9 arranged in the tongue 7 is at a spacing from a head region 14 placed on the end of the tongue 7 such that a first part region 15 which is directed toward the inside side face 13 of the first panel element A is produced. In addition, the first part region 15 is aligned parallel to an outside side face 16 which is located opposite the inside side face 13 of the first panel element A. Consequently, the first part region 15 and the head region 14 of the tongue 7 merge at right angles into one another.

The tongue 7 is developed at its region that is located opposite the first part region 15 such that it merges seamlessly and without any offset into the outside side face 16. In the same way, the side of the first edge strip 8 that is located opposite the flank 12b of the first groove 6 is also realized such that it merges seamlessly without any offset into the inside side face 13 of the first panel element A.

Both the first edge strip 8 and the first groove 6 comprise bevels 17 arranged thereon, the first edge strip 8 merging via the bevels 17 both into the bottom flank 12b of the first groove 6 and into the inside side face 13 of the first panel element A, whilst the bottom 11 of the first groove 6 merges via the bevels 17 into the flanks 12a, 12b of the first groove 6.

Figure 4:
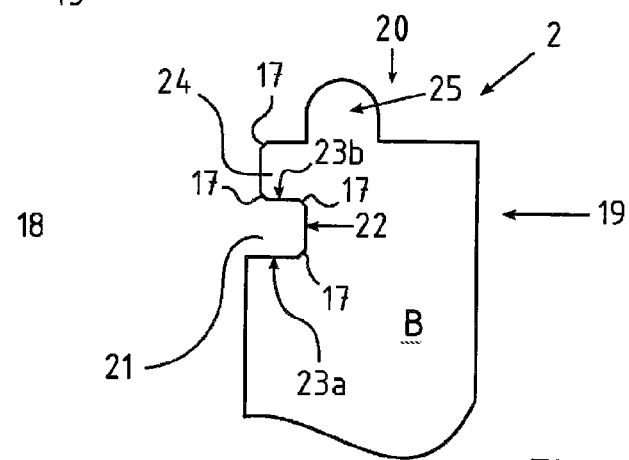
FIG. 4 shows the same method of representation of a further panel element of the detail from FIG. 2.

FIG. 4 shows the corresponding counterpart to the first panel element A from FIG. 3 in the form of the second panel element B. In relation to FIG. 2, in the present case this is also taken from the panel connection 1, as a result of which the realization of its coupling means 2 is clarified. The second panel element B comprises an inside edge region 18 and an outside edge region 19 which is located opposite the inside edge region 19, between which, at the end face, extends a second end face 20 of the second panel element B. The inside edge region 18 and the outside edge region 19 of the second panel element B directly connect to the second end face 20.

As can be seen, the inside edge region 18 comprises a second groove 21 which has a bottom 22 which extends parallel to the inside edge region 18 and flanks 23a, 23b which ascend from said bottom toward the inside edge region 18. In the present case, the flanks 23a, 23b of the second groove 21 are aligned parallel to one another and in each case are arranged at right angles to the inside edge region 18. The second groove 21 is spaced from the second end face 20 laterally over a second edge strip 24, the two sides of the second edge strip 24 being formed, when looking at the representation of FIG. 2, by the upper flank 23b of the second groove 21 and by part of the second end face 20 located opposite the flank 23b. In the present case, the second edge strip 24 consequently merges into the second end face 20.

Analogous to the development of the first panel element A from FIG. 3, the second panel element B of FIG. 4 also comprises individual bevels 17 by means of which both the bottom 22 of the second groove 21 merges into the flanks 23a, 23b thereof and the second edge strip 24 merges into the top flank 23b of the second groove 21 and the region of the second end face 20 located opposite the flank 23b.

A head strip 25, which extends beyond the second end face 20 of the second panel element B, is arranged on the second end face 20. Looking at the representation of FIG. 2, it is clear that, with the two panel elements A, B in the coupled state, the head strip 25 is arranged in the coupling channel 9. In addition, the head strip 25 is realized such that it is adapted in shape to the shape of the coupling channel 9, in particular to the rounded bottom 10. In addition, it is clear that when the first panel element A is coupled with the second panel element B, the tongue 7 of said first panel element A completely conceals the second end face 20 of said second panel element.

The coupling means 2 proceeding from FIGS. 3 and 4 are all developed such that they comprise a rigid realization. In other words, the individual parts of the coupling means comprise such types of cross section that they are purposefully not realized for any possible flexibility.

Figure 5:
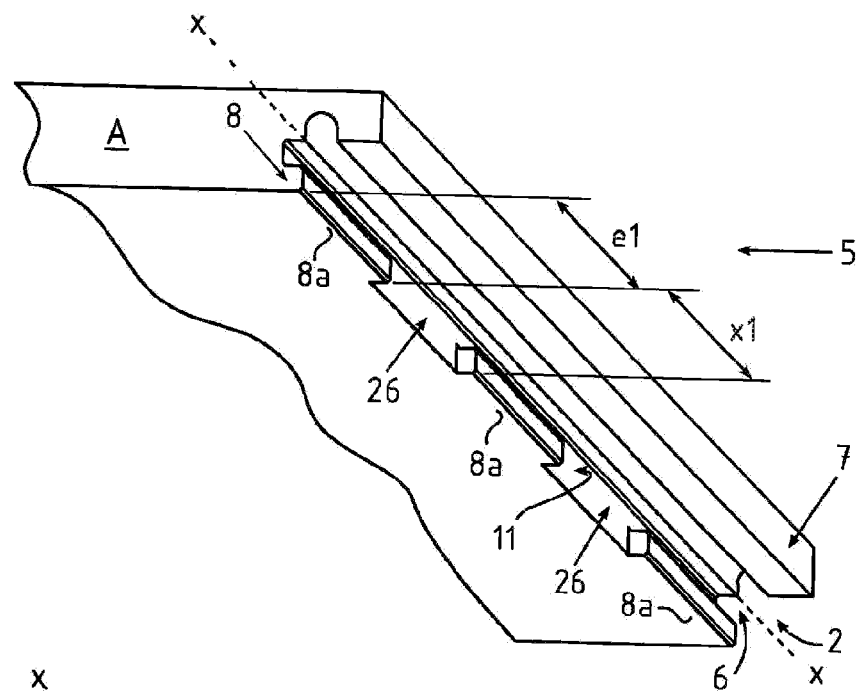
FIG. 5 shows a perspective method of representation of the panel element from FIG. 3.

FIG. 5 shows a perspective view of the individual first panel element A from FIG. 3. As can be seen, the coupling means 3 thereof extend in each case parallel to a longitudinal direction x of the first end face of the first panel element A. It is clear in this view that the first edge strip 8 is not continuous, but is divided into individual first strip portions 8a. The individual first strip portions 8a are realized by individual recesses 26 which reach up to the bottom 11 of the first groove 6. As a result, the first edge strip 8 is completely removed in the regions of the recesses 26. The individual recesses 26 cause the remaining first strip portions 8a to be arranged at a spacing x1 from one another parallel to the longitudinal direction x. The first strip portions 8a remaining in such a manner comprise a length e1 measured parallel to the longitudinal direction x.

Figure 6:
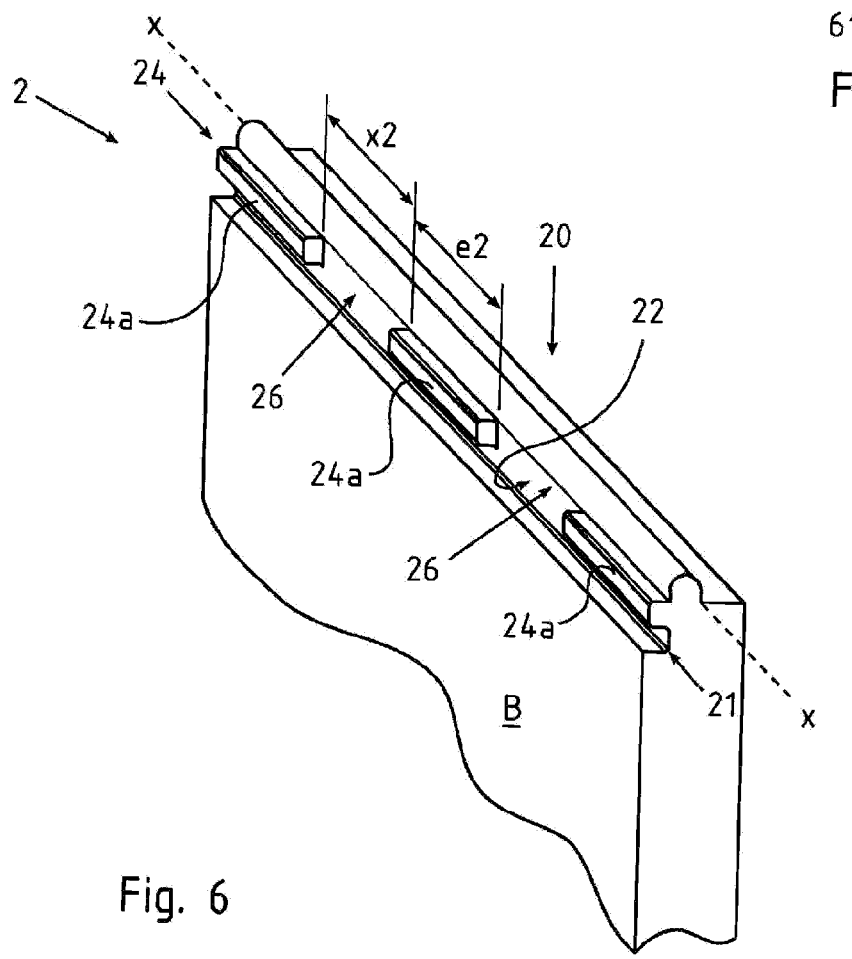
FIG. 6 shows a perspective representation of the panel element from FIG. 4.

FIG. 6 shows the counterpart to the first panel element A shown in FIG. 5 in the form of the second panel element B. Contrary to the representation in FIG. 4, the present one is also shown in perspective. In said representation, it is additionally clear that the coupling means 2 thereof also extend parallel to a longitudinal direction x of the second end face 20 of the second panel element B. In particular, the second edge strip 24 is also broken by individual recesses 26 such that the second edge strip 24 is also divided into individual second strip portions 24a. As a result of the recesses 26, the second edge strip 24 is also completely removed up to the plane of the bottom 22 of the second groove 21. As a result, the remaining second strip portions 24 are also arranged at a spacing of x2 with respect to one another. The second strip portions 24a have a length e2 which extends between the recesses and is measured parallel to the longitudinal direction x of the second end face 20.

Looking at FIGS. 5 and 6, it can be seen that the first strip portions 8a of the first panel element A, with reference to their spacing x1 between one another, correspond to the length e2 of the second strip portions 24a of the second panel element B. Contrary to this, the spacing x2 of the second strip portions 24a of the second panel element B is also set such that it also corresponds to the respective length e1 of the first strip portions 8a of the first panel element A. In each case, the individual strip portions 8a, 24a are arranged and realized in such a manner with respect to one another that, with the two panel elements A, B in the coupled state, the first strip portions 8a and the second strip portions 24 undercut one another at least in regions. In this connection, the first strip portions 8a of the first panel element A are arranged in the second groove 21 of the second panel element B, whilst the second strip portions 24a of the second panel element B are arranged in the first groove 6 of the first panel element A.

As has already been made clear in FIGS. 1 and 2, in each case the first strip portions 8a are adapted in shape to the second groove 21 and the second strip portions 24a are adapted in shape to the first groove 6. In this way, as sturdy a seat as possible is produced when the two panel elements A, B are in the coupled state.

In order to complete the coupling of the two panel elements A, B, they are first of all moved closer to one another until at least one of the first strip portions 8a of the first panel element A has slipped through between two of the second strip portions 24 of the second panel element B. In this case, the respective strip portions 8a, 24a slide past one another by being guided through between the respective recesses 26 of, in each case, the other panel element A, B. The two panel elements A, B continue to be moved closer to one another completely in this manner until the strip portions 8a, 24a of one of the panel elements A, B are located in the plane of the groove 6, 21 of the, in each case, other panel element A, B. In this connection, the head strip 25 of the second panel element B and the corresponding coupling channel 9 of the first panel element A also move into contact with one another, the same moving into total engagement with one another as a result of the corresponding strip portions 8, 24a when reaching the planes of the respective groove 6, 21.

A defined relative movement of the two panel elements A, B with respect to one another then takes place and this is effected in a locking direction which extends parallel to the longitudinal direction x of the end faces 5, 20. In this connection, the two panel elements A, B are displaced in opposite directions to one another until at least one of the first strip portions 8a is arranged at least in portions in the second groove of the second panel element and consequently also the second strip portion 24a of the second panel element is arranged at least in portions in the first groove 5 of the first panel element A. In this way, at least one of the first strip portions 8a undercuts one of the second strip portions 24a, as a result of which a durable connection is created between the two panel elements A, B.

Figure 7:
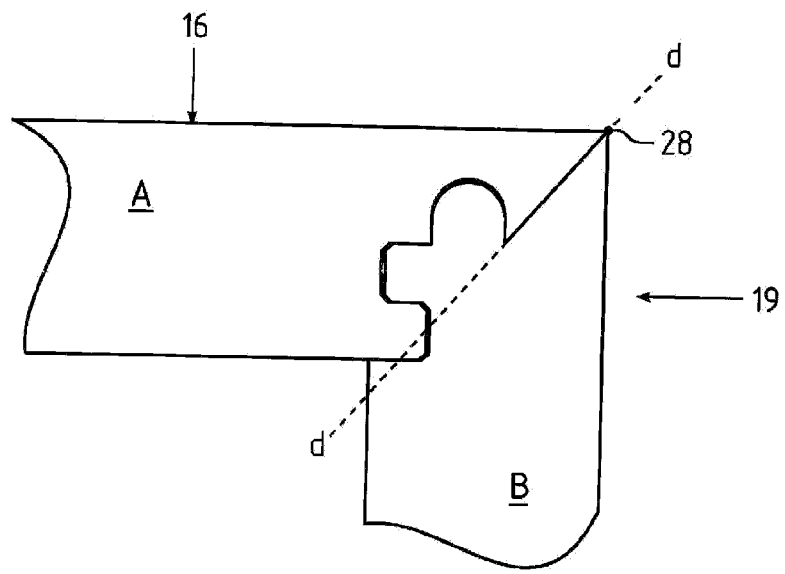
FIG. 7 shows the same method of representation of the detail from FIG. 2 in an alternative development.

FIG. 7 provides an alternative development form of the connection region between the panel elements A, B, where the connection plane d is inclined in relation to the representation in FIG. 2. The developments of the two panel elements A, B giving cause for this are contained in the following FIGS. 8 and 9.

Figure 8:
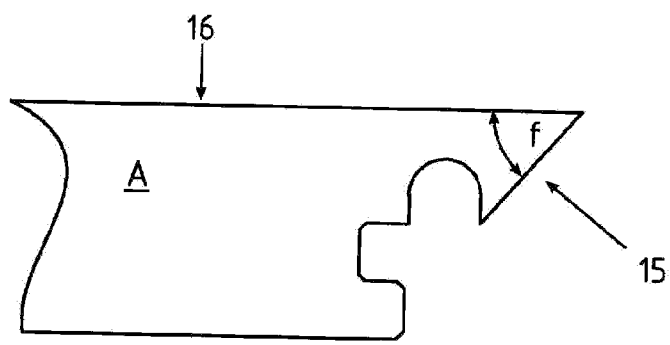
FIG. 8 shows the same method of representation of a panel element of the alternative development from FIG. 7.

FIG. 8 shows the alternative development of the first panel element A, where the first part region 15 is inclined in such a manner in relation to the outside side face 16 that they enclose between them a first angle f of less than 90 degrees. In the present case, the angle f is greater than 45 degrees, such that the connection plane d does not precisely intersect the inside corner placed in the section of the inside side face 13 and the inside edge region 18.

Figure 9:
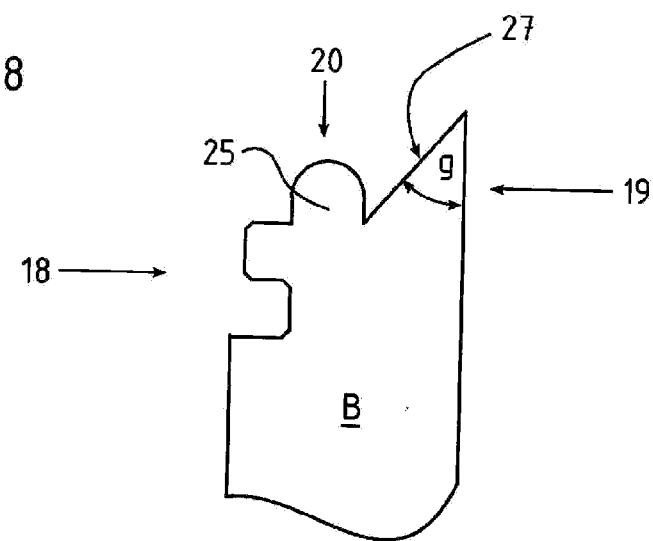
FIG. 9 shows the same method of representation of a further panel element of the alternative development from FIG. 7.

In contrast, the second panel element B in FIG. 9 also comprises an inclined part region 27 of the second end face 20 which extends between the head strip 25 and the outside edge region 19 of the second panel element B. The part region 27 and the outside edge region 19 of the second panel element B also enclose between them an angle g of less than 90 degrees. In the present case the angle g is set at less than 45 degrees.

Obviously, the angle g can be realized in an identical manner to the angle f of the first panel element A. In addition, the connection planes d can also intersect the inside corner.

With reference to FIG. 7, the two part regions 15, 27 are inclined in such a manner that, with the two panel elements A, B in the connected state, the connection plane d, which extends between the first part region 15 and the second part region 27, intersects an outside corner 28 of the panel connection 1. The outside corner 28, in this case, is located in the point of intersection between a plane applied onto the outside edge region 19 of the second panel element B and a plane applied onto the outside side face 16 of the first panel element A.

Figure 10:
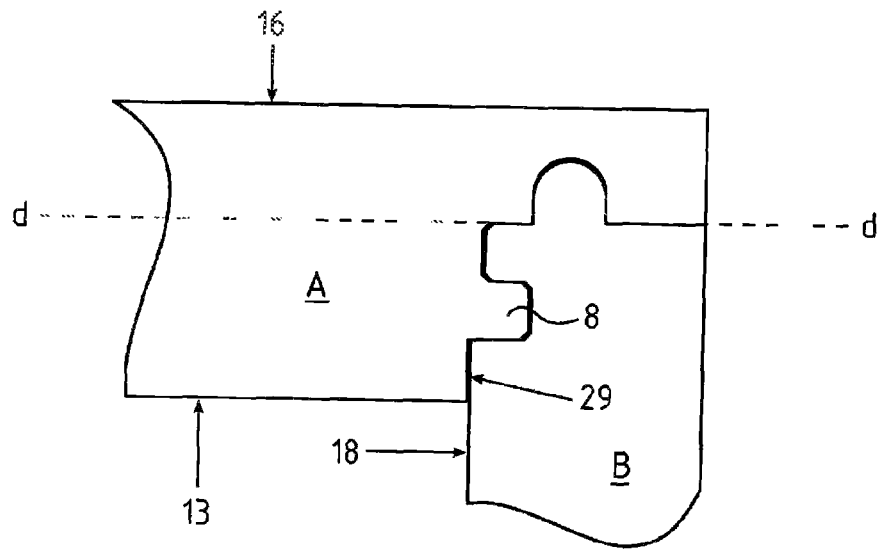
FIG. 10 shows the same method of representation of an alternative development of the detail from FIG. 2.

FIG. 10 shows a further alternative development of the connection region between the panel elements A, B. As can be seen, in the present case the inside side face 13 of the first panel element A is spaced further from the outside side face 16 thereof such that the first edge strip 8 does not merge in a plane into the inside side face 13 of the first panel element A. As a result of the gap to the inside side face 31, there is an offset in the form of a step 29 which, with the two panel elements A, B in the coupled state, abuts against the inside edge region 18 of the second panel element B. The arrangement of the step 29 is combined in the present case with the development of the connection region from FIG. 2, the connection plane d running parallel to the outside side face 16 of the first panel element A.

Figure 11:
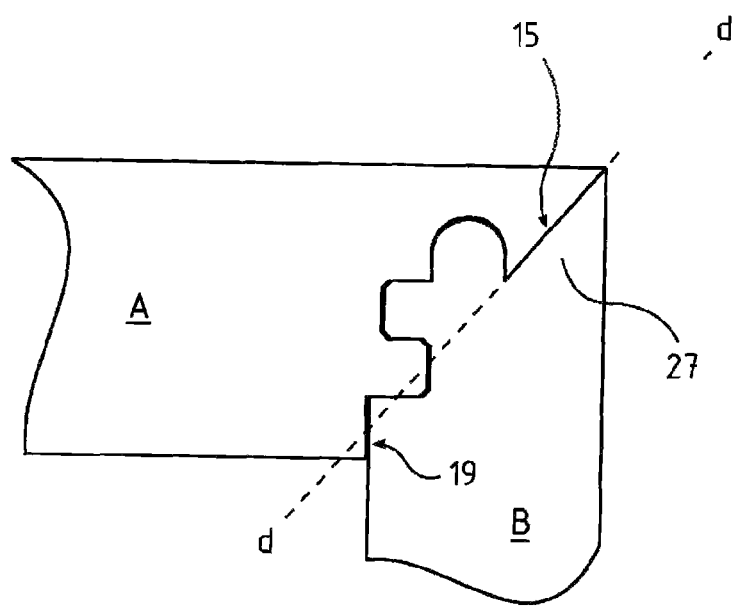
FIG. 11 shows the same method of representation of an alternative development of the detail from FIG. 7

FIG. 11 also shows the arrangement of the step 29 on the first panel element A, whereas the connection plane d is inclined in relation to the representation in FIG. 10 and with reference to the first part region 15 and the second part region 27 corresponds to the development in FIGS. 7 to 9.

Figure 12:
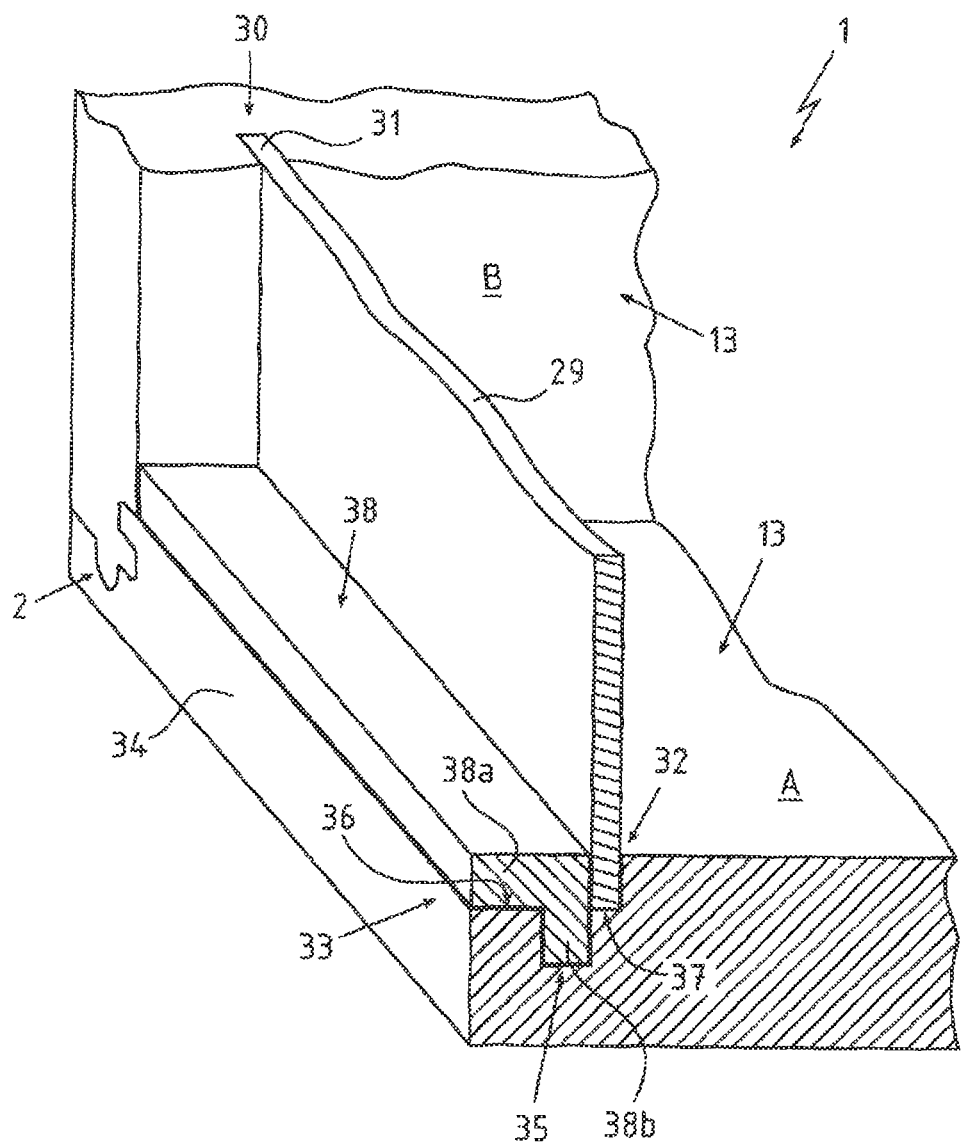
FIG. 12 shows a perspective method of representation of a cutout of a detail of a panel connection according to the invention.

FIG. 12 shows a perspective cutout of the panel connection 1 according to the invention produced from the first panel element A and the second panel element B. As can be seen, the panel connection 1 is supplemented by an additional rear wall 29. For this purpose, the second panel element B, which rises in a perpendicular manner when looking at the representation of FIG. 12, comprises a groove 30, inside which the rear wall 29 is arranged by way of a side edge region 31. In addition, the bottom, when looking at the representation of FIG. 12, horizontally aligned first panel element A also comprises a further groove 32 which is in alignment with the groove 30 of the second panel element B. Insofar as several panel elements A, B are assembled to form a closed frame, corresponding grooves 30, 32 can be arranged circumferentially inside said frame in a manner not explained in any more detail for receiving the rear wall 29.

In order to provide a frame, not shown in any more detail, assembled from at least three panel elements A, B with such a rear wall 29, they have to be arranged inside individual grooves 30, 32 before the, in each case, last panel element A, B closes the frame to be produced. In order to allow for the necessary relative movement for locking the panel elements A, B, the, in each case, last panel element A is able to include not just one simple groove 32 for receiving the rear wall as the rear wall is supported in the, in each case, other grooves 30 during the relative movement of the panel element A, B and thus prevents the locking movement of the last panel element A. In order to make this possible, nevertheless, the invention provides the widening of the groove 32 of the first panel element A in the form of a notch 33 which widens the groove 32 up to a head region 34 of the first panel element A. A further groove 35 is provided inside said notch 33, the groove 32 of the first panel element A merging in the manner of stairs into the groove 35 of the notch 33.

In this connection, care must be taken to ensure that a bottom 36 of the notch 33 extends at least along the plane of a bottom 37 of the groove 32 such that the rear wall 29 lies beyond the same inside the notch 33 during the locking movement and, in this case, rests to a maximum on the respective bottom 36, 37. The depth of the notch 33 which extends in the plane of the first panel element A, in this case, has to correspond at least to the length of the locking movement which is produced, in particular, as a result of the respective length e1, e2 of the first and second strip portions 8a 24a of FIGS. 5 and 6.

A clamping strip 38 is provided in order to hold the rear wall 29 inside the closed frame produced from individual panel elements A, B also on the last panel element A. With reference to its cross sectional form, the clamping strip 38 is adapted, in this case, to the notch 33 and the groove 35 arranged thereon. In this case, the depth of the clamping strip 28 corresponds to the depth of the notch 33 minus the width of the groove 32 in which the rear wall 29 is arranged. On account of the cross sectional adaptation and the necessary holding action, the clamping strip 38 has a two-leg cross section, a first leg 38a resting on the bottom 36 of the notch 33, whilst a second leg 38b of the clamping strip 38 is arranged in the groove of the notch 33. As soon as the panel elements A, B which form a frame are connected together as a result of the locking movement, the rear wall 29 is arranged circumferentially in the grooves 30, 32 of the panel element A, B such that the clamping strip 38 is able to be inserted into the notch 33 and in particular into the groove 35 thereof. The clamping strip 38 forms an additional flank of the groove 32 in the first panel element A, inside which the rear wall 29 is securely held.

In an alternative development which is not shown in any more detail, the leg 38b which engages in the groove 35 of the notch 33 can comprise at least in regions an inclined or thickened development such that the clamping strip 38, with the corresponding use of force, is able to be moved into the notch 33 and in particular into the groove 35 thereof. In contrast, the groove 35 of the notch 33 can obviously also comprise an inclined or tapering region, as a result of which such a clamping action, which requires the corresponding use of force, can also be created. In order to open the frame that has been created in this manner from individual panel elements A, B, it is first of all necessary to remove the clamping strip 38, as a result of which the unlocking movement of the last panel element A is made possible in order to release the connection to an adjacent panel element B.

LISTS OF REFERENCES

1—Panel connection
2—Coupling means
3—Outside
4—Butt joint
5—First end face
6—First groove
7—Tongue
9—First edge strip
8a—First strip portion
9—Coupling channel
10—Bottom
11—Bottom
12a—Flank 12b—Flank
13—Inside side face
14—Head region
15—First part region
16—Outside side face
17—Bevel
18—Inside edge region
19—Outside edge region
20—Second end face
21—Second groove
22—Bottom
23a—Flank
23b—Flank
24—Second edge strip
24a—Second strip portion
25—Head strip
26—Recess
27—Second part region
28—Outside corner
29—Rear wall
30—Groove
31—Edge region, at the side
32—Groove
33—Notch
34—Head region
35—Groove
36—Bottom
37—Bottom
38—Clamping strip
38a—Leg
38b—Leg
A—First panel element
B—Second panel element
c—Angle
d—Connection plane
e1—Length
e2—Length
f—Angle
g—Angle
x1—Spacing
x2—Spacing

The invention claimed is:

1. A glueless panel connection, comprising:
at least one first panel element and one second panel element which are connectable together by means of coupling means which are arranged on said panel elements and extend parallel to a longitudinal direction of a first end face of the first panel element and of a second end face of the second panel element, wherein the coupling means are integral components of the respective panel element and are of the same material, and in this case enclose between them an angle that is not equal to 180°, wherein as coupling means of the first panel element has a first groove on its first end face and the second panel element has an inside edge region which is connected to its second end face and has a second groove which is defined at a side by a second edge strip which merges into the second end face, wherein the first groove is delimited by a tongue and a first edge strip which is recessed in relation to the tongue, characterized in that the first edge strip is divided into individual first strip portions and the second edge strip is divided into individual second strip portions such that, with the panel elements in the coupled state, the first strip portions and the second strip portions undercut one another at least in regions, wherein the first strip portions are arranged in the second groove and the second strip portions are arranged in the first groove, and
wherein the second end face has a head strip which extends parallel to the longitudinal direction thereof and the tongue comprises a coupling channel which corresponds with the head strip, wherein the head strip, with the panel elements in the coupled state, is arranged in the coupling channel.

2. The panel connection as claimed in claim 1, characterized in that the first strip portions are arranged at a spacing from one another and the second strip portions are arranged at a spacing from one another.

3. The panel connection as claimed in claim 1, characterized in that the spacing between the first strip portions corresponds at least to a length of the second strip portions measured parallel to the longitudinal direction of the second end face and/or the spacing between the second strip portions corresponds at least to a length of the first strip portions measured parallel to the longitudinal direction of the first end face.

4. The panel connection as claimed in claim 1, characterized in that the head strip is adapted in shape to the coupling channel and/or the first strip portions are adapted in shape to the second groove and/or the second strip portions are adapted in shape to the first groove.

5. The panel connection as claimed in claim 1, characterized in that the tongue merges into an outside side face of the first panel element.

6. The panel connection as claimed in claim 1, characterized in that, with the panel elements in the coupled state, the tongue completely conceals the second end face.

7. The panel connection as claimed in claim 1, characterized in that the coupling means are rigid.

8. The panel connection as claimed in claim 1, characterized in that at least one first part region of the tongue and an outside side face of the first panel element enclose between them a first angle and at least one second part region of the second end face and an outside edge region of the second panel element located opposite the inside edge region enclose between then a second angle of in each less than (<) 90°.

9. The panel connection as claimed in claim 8, characterized in that in the connected state of the panel elements, a connection plane which extends between the first part region and the second part region intersects an outside corner which is placed in the point of intersection of the outside edge region of the second panel element and the outside side face of the first panel element.

10. The panel connection as claimed in claim 1, characterized in that a panel connection includes at least three panel elements, wherein in the state coupled together, the panel elements form a glueless carcass in the form of a closed frame.

11. The panel connection as claimed in claim 10, characterized in that the panel elements comprise a groove which extends inside an assembled frame and in which a rear wall is arrangeable, wherein there is provided a wedge element which is arrangeable between one of the inside side faces of one of the panel elements and the rear wall.

12. The panel connection as claimed in claim 11, characterized in that the wedge element comprises a latching lug which, with the wedge element arranged between one of the inside side faces of one of the panel elements and the rear wall, catches behind the rear wall.

13. The panel connection as claimed in claim 1, characterized in that the first edge strip merges into an inside side face of the first panel element.

14. A method for the glueless connection of at least two panel elements which enclose between them an angle which is not equal to 180° to form a panel connection with the features of claim 1, wherein the panel elements comprise coupling means which are engageable with one another and have edge strips which are divided into individual strip portions, wherein the panel elements to be connected together are brought closer together until at least one of the first strip portions of the first panel element is slid through between two of the second strip portions of the second panel element in a plane of a second groove arranged on an inside edge region of the second panel element and at least one of the second strip portions in a plane of a first groove arranged on a first end face of the first panel element, wherein the panel elements are then displaced in opposite directions to one another by means of a defined relative movement with respect to one another into a locking direction which extends parallel to a longitudinal direction of the first end face until the first strip portion is arranged at least in portions in the second groove and the second strip portion is arranged at least in portions in the first groove such that one of the first strip portions undercuts one of the second strip portions at least in portions.

15. The method as claimed in claim 14, characterized in that at the end of moving the panel elements closer, a head strip of the second panel element engages in a coupling channel of the first panel element, wherein the head strip is displaced parallel to the longitudinal direction during the subsequent relative movement of the panel elements inside the coupling channel.

\* \* \* \* \*